United States Patent [19]
Johnson et al.

[11] Patent Number: 5,616,250
[45] Date of Patent: Apr. 1, 1997

[54] METHOD FOR MIXING COAGULATING AGENTS INTO A CONTAMINATED WATER FLOW, AND FOR REMOVING CONTAMINANTS THEREFROM

[75] Inventors: Dennis E. J. Johnson, Colorado Springs; Clifford F. Frith, Boulder, both of Colo.

[73] Assignee: Aqua-Ion Systems, Littleton, Colo.

[21] Appl. No.: 481,994

[22] Filed: Jun. 7, 1995

Related U.S. Application Data

[63] Continuation-in-part of Ser. No. 200,749, Feb. 23, 1994, Pat. No. 5,443,719.
[51] Int. Cl.$^6$ ........................................... C02F 1/48
[52] U.S. Cl. ..................... 210/695; 204/557; 210/709; 210/717; 210/721; 210/728; 210/738; 210/748
[58] Field of Search ................... 204/149, 152; 210/702, 695, 709, 721, 738, 748, 752, 758, 101, 143, 199, 205, 223, 222, 207, 717, 728

[56] References Cited

U.S. PATENT DOCUMENTS

| | | | |
|---|---|---|---|
| 3,186,929 | 6/1965 | Rippie | 204/155 |
| 3,697,420 | 10/1972 | Blaisdell et al. | 210/695 |
| 4,094,783 | 6/1978 | Jackson | 210/703 |
| 4,123,341 | 10/1978 | Gnieser et al. | 204/152 |
| 4,238,326 | 12/1980 | Wolf | 210/695 |
| 4,343,707 | 8/1982 | Lucas | 210/695 |
| 4,382,866 | 5/1983 | Johnson | 210/748 |
| 4,562,014 | 12/1985 | Johnson | 261/76 |
| 4,563,286 | 1/1986 | Johnson et al. | 210/721 |
| 4,655,933 | 4/1987 | Johnson et al. | 210/748 |
| 4,857,204 | 8/1989 | Joklik | 210/695 |
| 4,956,080 | 9/1990 | Josefik | 210/109 |
| 5,192,423 | 3/1993 | Duczmal et al. | 209/164 |
| 5,443,719 | 8/1995 | Johnson et al. | 210/101 |

FOREIGN PATENT DOCUMENTS

| | | |
|---|---|---|
| 478770 | 7/1929 | Germany. |
| WO8102685 | 10/1981 | WIPO. |

*Primary Examiner*—Peter A. Hruskoci
*Attorney, Agent, or Firm*—Michael de Angeli

[57] ABSTRACT

An improved system and novel components and methods for treating waste waters contaminated with a variety of commercial, municipal, and/or industrial contaminants. A mixing vessel according to the invention comprises upper and lower mixing chambers connected by an intermediate tubular section and a fluid exit tube running coaxially down the center of the intermediate tubular portion. The fluid stream to be treated flows in a spiral pattern vertically through the vessel, providing turbulent flow. The flow stream may be subjected to electric or magnetic fields. In one embodiment, streams of the fluid to be treated and of an ionized coagulant are combined prior to entry into the vessel; in another embodiment, the incoming flow stream is combined with the coagulants in the mixing vessel. The incoming flow may be split between annular passageways to improve mixing. Magnetite particles may be generated in situ and added to the flow stream to further encourage coagulation in the presence of a magnetic field. After exiting the mixing chamber, the coagulated contaminants may be removed using a variety of filtration steps.

12 Claims, 4 Drawing Sheets

METHOD FOR MIXING COAGULATING AGENTS INTO A CONTAMINATED WATER FLOW, AND FOR REMOVING CONTAMINANTS THEREFROM

CROSS REFERENCE TO RELATED APPLICATIONS

This application is a continuation-in-part of Ser. No. 08/200,749, filed Feb. 23, 1994, now U.S. Pat. No. 5,443,719.

FIELD OF THE INVENTION

This invention relates generally to the field of water purification. More particularly, this invention relates to an improved apparatus, method, and system for thoroughly mixing coagulating agents with contaminated water streams, in order to improve the efficiency of coagulating unwanted contaminants as a step in their removal from the water stream.

BACKGROUND OF THE INVENTION

There are countless applications in which it is important to remove contaminants from water streams prior to further treatment or prior to discharge into sewers, waterways, and the like. Examples of materials which must be removed from such water streams include oil and grease emulsions, heavy metals, contaminants exhibiting basic oxygen demand (BOD), e.g., organic food particulates, and contaminants exhibiting chemical oxygen demand (COD), such as organic dyes, colloidal solid particulates, and agricultural organic contaminants. For example, the effluent from a typical commercial car wash or coin-operated laundry contains oil and grease emulsions, heavy metals, and colloidal solid particulates. Other process streams may include various other combinations of these and additional contaminants, in a relatively large volume of water. As these contaminants are normally dissolved or dissociated in the water stream—that is, as distinguished from being comparatively large particles—they are difficult to remove employing typical physical filtration steps.

The prior art teaches many process steps and techniques, many devices, and numerous combinations thereof for causing such particulates and other contaminants in a water stream to coagulate (including in this term "coalesce", "flocculate", "agglomerate", and other terms of like import) so that they can be removed by physical separation processes, typically including filtration. For example, it is known to add flocculants, coagulants, and the like to a process stream, again, to draw such contaminants out of solution and to agglomerate particles for filtration.

It is also known to mix oxidant gases and the like including ionized oxygen or allotropes thereof into waste water streams, specifically for coagulation of contaminants and the like for subsequent filtration. See U.S. Pat. No. 4,655,933 to one of the inventors hereof and another. U.S. Pat. No. 4,562,014 to one of the inventors hereof discloses a system for so doing involving a venturi for dispersing a gas into a liquid to be treated, encouraging mixing of the gas and the liquid due to the drop in pressure at the venturi.

It is also known to perform a variety of filtration steps downstream of a system for flocculating or coagulating pollutants in a water stream by passing the stream through an electrochemical filtration device. See U.S. Pat. No. 4,382,866 to one of the inventors hereof, and co-pending commonly assigned application Ser. No. 08/377,620, filed Jan. 25, 1995.

The art is also aware that many undesired materials to be removed from a water stream are typically polarized, such that a magnetic field in the water stream can be of use in causing such particles to agglomerate, coagulate, and/or coalesce for subsequent removal. However, the art has not provided a simple and efficient way of applying a magnetic field to such a stream of water to be treated.

Further, the art is aware that any coagulant to be mixed with a water stream to be purified must necessarily be thoroughly mixed with the water stream, so as to obtain maximum efficiency in its use. This is true whether the coagulant is an ionized gas, such as oxygen or nitrogen, or an anionic or cationic polymer liquid as often used for coagulant or flocculant purposes. However, the art does not teach fully satisfactory apparatus for thorough and complete mixing of coagulants, typically comprising ionized gases or liquids, with a stream of water to be treated thereby.

OBJECTS OF THE INVENTION

It is therefore an object of the invention to provide a system, apparatus, and method for very efficiently mixing a stream of an ionized gas or liquid coagulant with a stream of a liquid to be treated, and specifically for doing so in the presence of a magnetic field, such that the ionizing gas or liquid is thoroughly mixed with the liquid to be treated under circumstances encouraging formation of coagulant and flocculant masses for subsequent filtration.

It is a further object of the invention to provide a simple apparatus for thus mixing an ionized gas or liquid with a stream of liquid to be treated and having the additional capability of adding magnetite coagulant particles to the process stream where necessary, also in a simple and efficient manner.

It is a further object of the invention to provide a specific device for treating liquid flow streams containing various types of undesired contaminants, wherein an ionized gas or liquid coagulant is efficiently mixed with the stream to be treated in the presence of a magnetic field to ensure very efficient mixing and coagulation, for subsequent removal of the contaminants.

SUMMARY OF THE INVENTION

The above objects of the invention and others which will appear as the discussion below proceeds, and the listed needs of the art, are met by the method, system, and apparatus of the invention for thoroughly intermixing an ionized coagulant with a stream of water containing contaminants to be treated thereby. The apparatus of the invention comprises a novel mixing vessel including upper and lower mixing chambers connected by an intermediate elongated tubular portion.

In a first embodiment, a stream of fluid to be treated—typically contaminated water—is initially combined with a stream of one or more ionized coagulants, in an inlet tube disposed such that the combined stream enters the lower mixing vessel horizontally, but off axis, so as to define a tangential flow path extending around the lower vessel. A fluid exit tube extends vertically through the centers of the lower mixing chamber, the intermediate tubular portion, and the upper mixing chamber. Accordingly, fluid entering the lower mixing chamber off axis, as mentioned, tends to move in a highly turbulent, generally spiral flow pattern upwardly through the lower mixing chamber and then through the intermediate tubular portion, finally reaching the upper mixing chamber, and pouring into the open upper end of the exit tube to be drained vertically downwardly.

In a second embodiment, the water to be treated is introduced at the upper mixing chamber, and flows first downwardly, through an annular passage, into a lower mixing chamber, and upwardly through a central passageway. In this embodiment, coagulant reagents and ionized gas streams are mixed with the water stream in the outer annular passage. In both embodiments, the counter-current flow path provided ensures thorough mixing of the coagulant and ionized gas with the water stream to be treated.

A coil is wrapped around at least the intermediate tubular portion of the vessel, for applying a magnetic field to fluid flowing therein. Preferably, the coil is energized by a DC potential, the polarity of which is reversed at intervals on the order of several minutes, to avoid build-up of coagulant within the vessel.

The ionized coagulant and the water to be treated may be combined at a reduced-diameter throat of a venturi tube, so that the ionized coagulant is injected into the incoming water stream at its point of highest pressure; because the stream is therefore immediately depressurized as it enters the vessel, the coagulant tends to disperse in the water stream.

The mixing vessel thus provides very turbulent mixing conditions, ensuring that the ionized coagulant is physically mixed thoroughly with the fluid to be treated, while the magnetic field further encourages the ionized coagulant to bind the contaminants to be removed, substantially all of which are also ionized or are polar.

In one preferred embodiment, the surfaces of the fluid exit tube exposed to the water stream and at least the inner surface of the intermediate elongated tubular portion of the vessel may be provided with a corrugated metallic surface defining a number of radially inwardly extending ridges, tending to cause further turbulence and enhanced physical mixing, as well as concentrating the magnetic field and thus increasing the magnetic enhancement of the coagulation process.

In a further embodiment of the system of the invention, magnetite coagulant particles, comprising particles of iron oxide, may be added to the process stream prior to combination with the ionized coagulant, or may be formed in situ, to provide nucleation sites further promoting coagulation of the contaminants to be removed from the process stream to be treated.

After exit from the vessel, the mixed stream of fluid to be treated and the ionized coagulant may be admitted to any of several types of filter for removing the coagulated contaminants therefrom. These may comprise an anode/cathode accelerator for further coagulating the contaminants to be removed by means of a further magnetic field, and one or more conventional filters comprising sand, charcoal, or the like, or other known filter media. The stream may additionally be admitted to a secondary reactor having a configuration similar to the first vessel for further coagulation of particularly difficult contaminants. The filters may be backflushed at intervals, and the filtrate removed for recovery or appropriate disposal.

BRIEF DESCRIPTION OF THE DRAWINGS

The invention will be better understood if reference is made to the accompanying drawings, in which.

DESCRIPTION OF THE PREFERRED EMBODIMENTS

Figure 1:
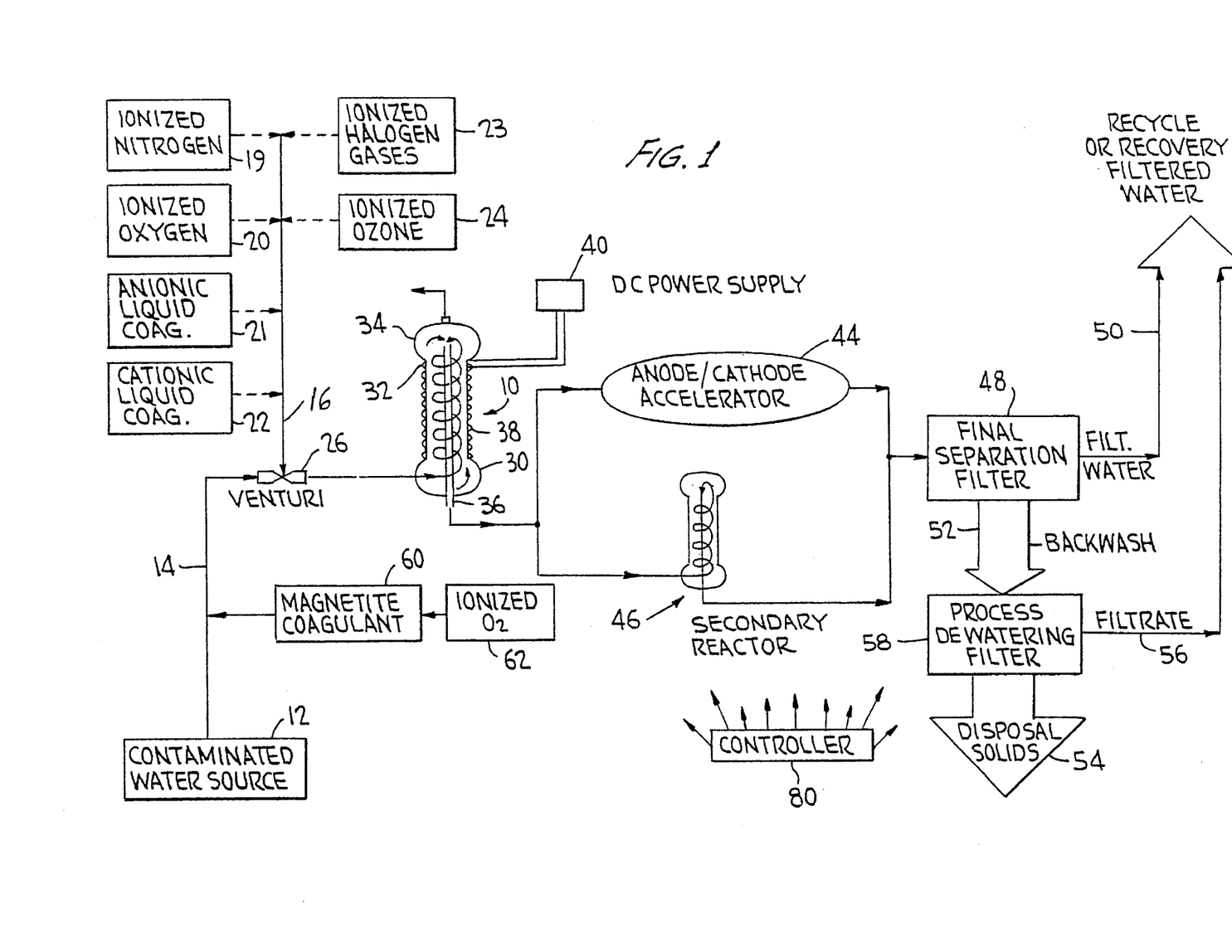
FIG. 1 shows an overall view of the system according to the invention.

As discussed above, the invention comprises several embodiments of a novel vessel for thoroughly and completely mixing an ionized coagulant with a stream of water or other liquid to be treated, and a method and system for its use in removing contaminants from a stream of water or other fluid to be treated. FIG. 1 shows an example of the system of the invention. A mixing vessel 10 receives a stream of contaminated water or other fluid from a source 12 connected to vessel 10 by an inlet conduit 14. The stream of water from the source 12 is combined with one or more of a selection of ionized coagulants provided along a second conduit 16. As indicated specifically, the ionized coagulant supplied may be ionized nitrogen supplied from a source 19, ionized oxygen from a source 20, an anionic liquid coagulant such as a polymer from a source 21, a cationic liquid coagulant from a source 22, further coagulant materials such as ionized halogens or ozone as indicated at 23 and 24, or mixtures of these, and other known coagulants.

In the embodiment of FIGS. 1–4, the streams of ionized coagulant and contaminated water or other fluid to be treated from source 12 are initially combined in a venturi 26. The venturi 26 receives the stream of water to be treated at a relatively large opening. The stream is then constrained to pass through a relatively small flow passage, increasing its velocity and pressure. The ionized coagulant is injected at substantially the smallest cross-section of the venturi, so that when the combined streams then pass into a passage of expanding cross-section, the coagulant tends to be dispersed in the reduced-pressure stream. Further details of the venturi are discussed below in connection with FIG. 2.

The stream of water or other fluid to be treated from source 12 and the ionized coagulant, having thus been preliminarily combined, are supplied to the vessel 10, details of one embodiment of which are discussed below in connection with FIGS. 2–4. As shown schematically in FIG. 1, the combined stream is admitted towards the bottom of a vertically-extending vessel 10 having a lower mixing chamber 30, an intermediate elongated tubular portion 32, and an upper mixing chamber 34. A fluid exit tube 36 extending coaxially through the vessel 10 has an open inlet end in the approximate center of the upper mixing chamber 34 and a lower exit end. Thus, the preliminarily combined streams of the fluid to be treated and the coagulant enter the lower mixing chamber and travel in a generally spiral path upwardly through the intermediate tubular portion 32, around the fluid exit tube 36, and enter the upper end of the fluid exit tube 36 in the center of the upper mixing chamber 34. This fluid path provides very substantial turbulence and excellent mixing of the ionized coagulant with the water to be treated.

A coil 38 of wire is provided around at least the intermediate tubular portion 32 of the vessel 10 and is connected to a DC power supply 40. When power supply 40 is energized, a magnetic field is emitted by coil 38, extending generally axially along the direction of elongation of the intermediate tubular portion of the vessel 10. This magnetic field tends to encourage intimate contact between the ionized coagulants and the contaminants of the fluid to be treated, aiding in coagulation and flocculation of the contaminants to be removed.

After exiting the vessel 10, the stream is directed to one or more of a variety of possible devices for separating the coagulated and flocculated contaminants from the water stream. As indicated in FIG. 1, these may comprise an anode/cathode accelerator 44, that is, a device defining an electric field extending parallel to the direction of flow of the stream for further separating ionized and polar materials therein. A secondary reactor generally similar to vessel 10 may also be provided as indicated at 46. The separation of the coagulated contaminants from the water stream is performed in a final separation filter 48 which may comprise any of a variety of known media such as sand filters, activated charcoal filters, mechanical filtration media, and combinations of these and other known filters. The filtered water may be passed at 50 to further purification devices such as ion exchange media, or the like, or may be directly reused. From time to time, filter 48 is backwashed as indicated at 52, and the collected contaminants removed and disposed of at 54. Further water may be recovered in this process as indicated at 56 by a dewatering step 58.

In connection with removal of certain contaminants, it may be desirable to add magnetite particles to the contaminated water stream. Magnetite particles are essentially iron oxide and are highly magnetic, thus tending to form nucleation sites for flocculation or coagulation of the contaminants to be removed from the water stream when exposed to the magnetic field from coil 32. Suitable magnetite particles can be provided by a source 60, comprising, for example, a device wherein a further water stream flows between coaxial closely-spaced electrically-insulated steel pipes. If a positive potential is applied to one of the pipes and a negative potential to the other, and if ionized oxygen is added as indicated at 62, particles of iron oxide will tend to form on the facing surfaces of the coaxial steel pipes and enter the water stream. As indicated, such iron oxide magnetic particles are very effective in nucleating the flocculation or coagulation of the contaminants to be removed from the water stream.

Figure 2:
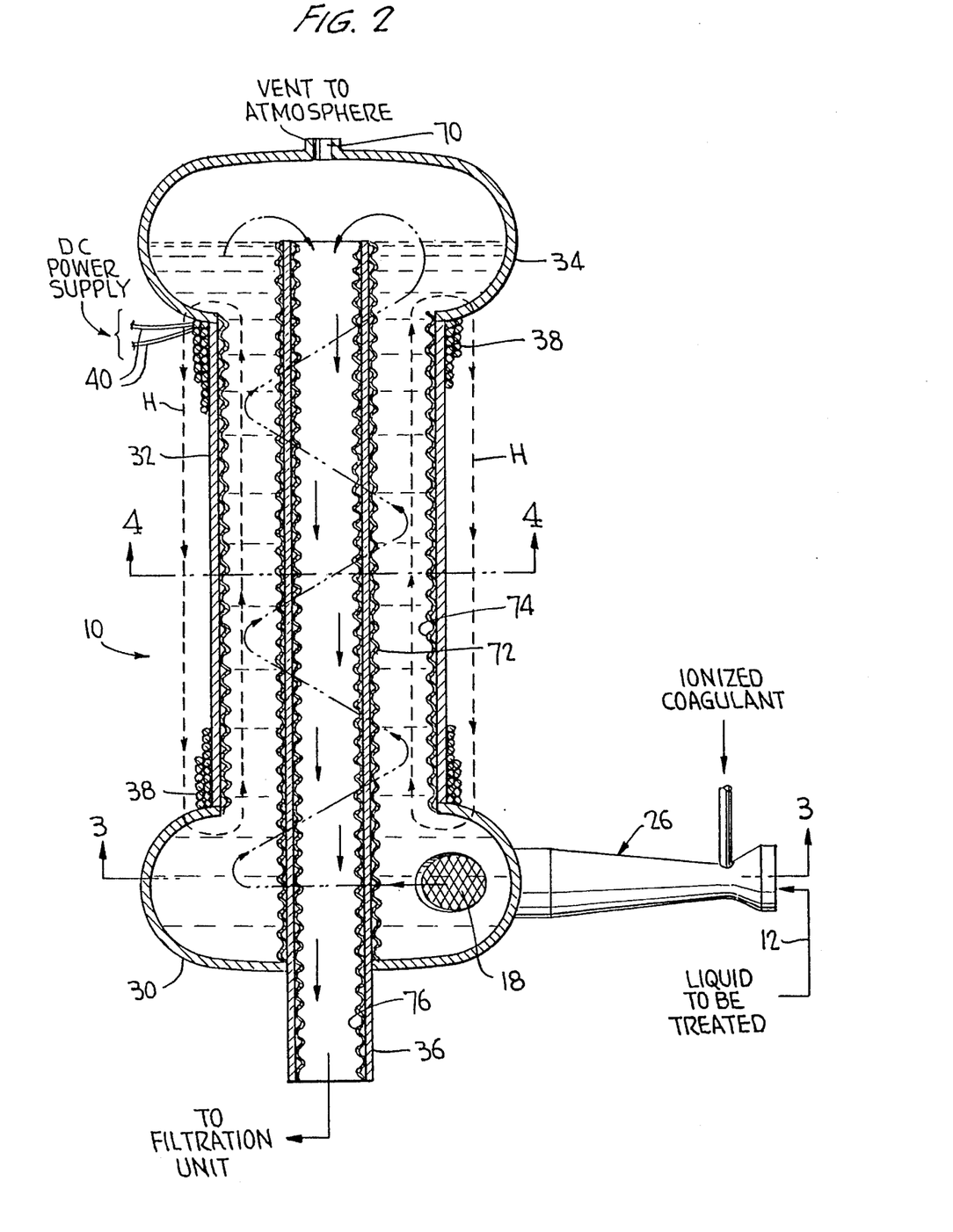
FIG. 2 shows a cross-sectional view through a first embodiment of the vertically elongated mixing vessel according to the invention, and the preferred venturi tube used at its inlet.
Figure 3:
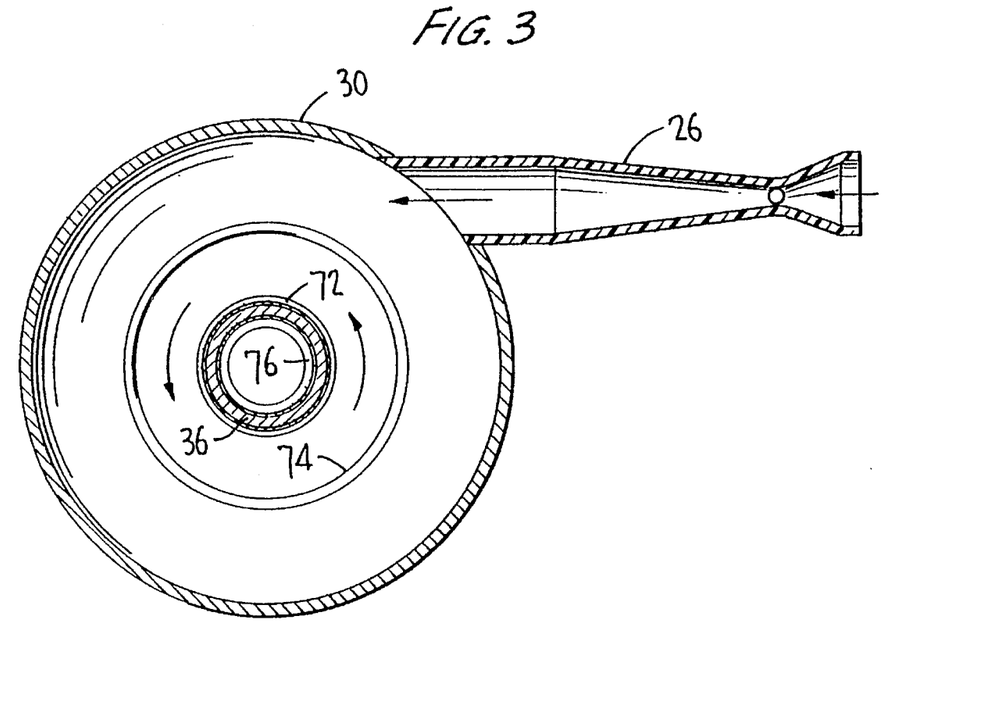
FIGS. 3 and 4 show cross-sections along the lines 3—3 and 4—4 of FIG. 2.
Figure 4:
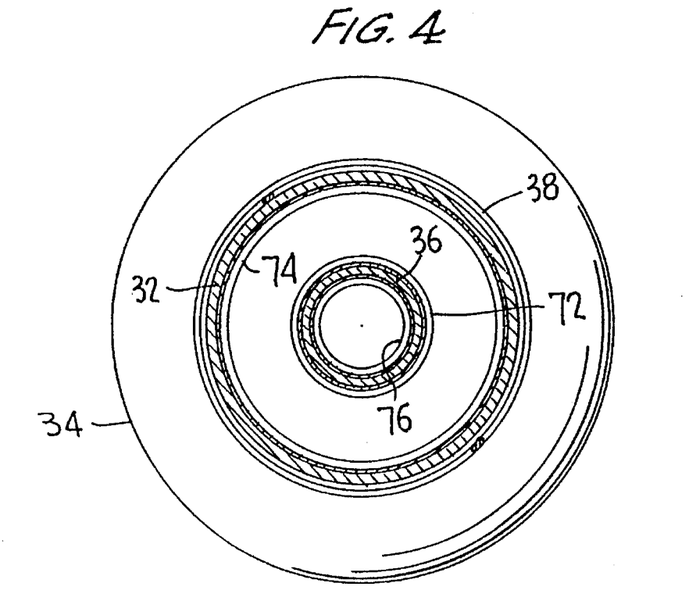

FIG. 2 shows further details of one embodiment of vessel 10, taken through its vertical axis, with FIGS. 3 and 4 showing sections along the line 3—3 and 4—4, respectively. The major components of the vessel 10 are, as mentioned above, the lower mixing vessel 30, an intermediate tubular portion 32, and an upper mixing vessel 34. These may be formed integrally of welded steel components. In a successfully tested embodiment, the upper and lower mixing vessels 30 and 34 are 8 inches in diameter, that is, horizontally in FIG. 2, and are 6 inches deep vertically, while the tubular intermediate section 32 is 6 inches in diameter and 24 inches long.

Within the vessel 10 extends a fluid exit tube 36 substantially coaxial with the intermediate tubular portion 32 and with vessels 30 and 34. As shown, the fluid exit tube 36 extends vertically downwardly from an upper inlet substantially in the center of the upper mixing vessel 34 to an exit opening beneath the bottom of the lower mixing vessel 30. The fluid exit tube is approximately two inches in diameter and may also be formed of steel so as to be welded to the lower mixing vessel 30 at its exit to conveniently provide support.

The liquid to be treated from source 12 and the ionized coagulant, including an ionized gas or liquid from any one of sources 19–24, or mixtures thereof, or other coagulant or flocculant materials, are combined in venturi 26, as discussed above. In a successfully tested embodiment, venturi 26 is approximately 11 inches long overall, has 1.5 inch diameter inlet and outlet openings, and tapers to a diameter of $\frac{5}{8}$ inch at its throat. The ionized coagulant is injected substantially at the throat of venturi 26, as shown, that is, at the maximum pressure point of the fluid stream, such that when the pressure in the mixture decreases towards the exit orifice of venturi 26, the coagulant tends immediately to be dispersed throughout the stream of liquid to be treated.

As indicated, the inlet into lower mixing vessel 30 from venturi 26 is generally horizontal, but is off-axis (see FIG. 3) such that the flow of the mixed liquid to be treated and coagulant tends to be circular, around fluid exit tube 36. Accordingly, the combined streams flow upwardly through intermediate tubular section 32 along a generally spiral flow path extending around fluid exit tube 36, thus ensuring thorough further mixing of the ionized coagulant with the fluid to be treated.

It will be appreciated throughout this discussion that if a stream of magnetite particles is added, this also is thoroughly mixed with the ionized coagulant and the fluid to be treated throughout the passage thereof through mixing vessel 10.

The mixture of the ionized coagulant, the fluid to be treated (and as noted, magnetite particles, if employed) exits vessel 10 by way of fluid exit tube 36. More particularly, the mixture enters fluid exit tube through its upper end as shown by the arrows in FIG. 2. At this point, there is no pressure in the system, as indicated by vent 70. This stream thus flows downwardly through the fluid exit tube and on to further filtration steps, as discussed above in connection with FIG. 1.

In a further preferred embodiment, a number of radially inwardly extending ridges, preferably of a ferromagnetic material, such as a suitable stainless steel, may be provided on the facing surfaces of the annular passageway between the fluid exit tube and intermediate tubular portion 32 of the vessel, and on the inner surface of fluid exit tube 36, by disposition of corrugated sleeves 72, 74, and 76 therein. Alternatively, such ridges might be formed in the surfaces of fluid exit tube 36 and intermediate tubular portion 32. These radially extending ridges have the effect of providing further mixing of the ionized gas or liquid and the liquid to be treated. As noted, these ridges are preferably formed of a ferromagnetic material such as a magnetic stainless steel, so that the magnetic field can further cause coagulation of the coagulant materials and the contaminants to be removed from the process stream to be treated.

It will be appreciated by those of skill in the art that the combination of (i) introduction of the ionized coagulant into the stream of fluid to be treated at a point of high pressure, followed by an immediate reduction in pressure; (ii) the continued swirling, countercurrent, turbulent mixing of the stream provided by the spiral path of the combined streams upwardly through vessel 10; (iii) the countercurrent change of flow direction when the streams flow over the open upper edge of fluid exit tube 36 and then downwardly through fluid exit tube 36; and (iv) turbulence due to the radially extending ridges on one or more of the inner surfaces of intermediate vertically extending tubular section 32 and the inner and outer surfaces of fluid exit tube 36, provides very thorough physical mixing of the ionized coagulant, magnetite particles, if employed, and the contaminants to be removed from the water stream to be treated. More particularly, since these materials tend to be attracted to one another, but may be present in relatively low concentrations, a thorough mixing as provided by vessel 10 according to the invention is highly desirable in order to encourage successful coagulation and flocculation of these materials so that they can be subsequently removed in essentially conventional filtration steps, or by combination of conventional and novel filtration steps, as discussed above in connection with FIG. 1.

According to a further aspect of the invention, and as discussed briefly above, coil 38 is disposed about at least the intermediate tubular section of the vessel 10 and is connected to power supply 40. When power supply 40 is energized, a magnetic field H of generally solenoidal configuration extends through at least intermediate tubular portion 32 of vessel 10, including the interior of exit tube 36, as depicted schematically in FIG. 2. In order that the magnetic field H can be efficiently employed, it is desirable that the materials of vessel 10 be ferromagnetic, e.g., mild steel as noted above.

It will be appreciated by those of skill in the art that most of the contaminants sought to be removed by the apparatus and system of the invention, these including oil and grease emulsions, heavy metals, materials exhibiting basic oxygen demand such as organic food particulates, materials exhibiting chemical oxygen demand such as organic dyes, colloidal solid particulates, agricultural organic contaminants, and other contaminants, largely comprise polar or ionic molecules responsive to a magnetic field. Similarly, the ionized coagulants are, of course, also responsive to a magnetic field, and, indeed, water molecules themselves are polar. Accordingly, when a solenoidal magnetic field H is applied as indicated by FIG. 2, these polar materials tend to become aligned with one another and are brought into still more intimate physical contact. This further encourages coagulation and flocculation and thereby increases the efficiency of removal of the contaminants from the process stream to be treated.

As indicated generally above, DC power is preferably employed to excite coil 38 to emit magnetic field H. Preferably the polarity of the DC power is reversed at intervals on the order of minutes. Reversal of the polarity of the power supply reverses the direction of the magnetic field H and tends to remove any polar molecules or the like that may have collected, for example, in the crevices formed by the radially inwardly extending ridges 72, 74, and 76.

In the successfully-tested embodiment of the system discussed above, coil 38 comprised 400 feet of 14 AWG stranded copper wire wrapped in two layers spiraling up and down the intermediate tubular portion 32 of the vessel 10.

In the preferred embodiment, the amount of power applied to coil 38 varies with the rate of flow of the fluid to be treated, and the ionized coagulant is similarly supplied at a rate responsive to the rate of flow of the fluid to be treated. Of course, the rate of supply of the ionized coagulant may also be varied with detected variation in the amount of contaminants present in the process stream to be treated. Similarly, the addition of magnetite particles from source 60 may be controlled responsive to the characteristics of the stream to be treated. In a particularly preferred embodiment a controller 80 (FIG. 1) such as a computer or the like, in combination with associated flow sensors, contaminant monitoring instrumentation, solenoid valves, and similarly well-known process control equipment may be provided to automatically control these and other system parameters, such as the periodic reversal of the polarity of the DC power applied to coil 38.

The following Table provides typical values of the DC voltage supplied to and the current drawn by coil 38 with respect to the rate of flow of the fluid to be treated from source 12, and also illustrates typical corresponding rates of injection of a typical gaseous ionized coagulant such as ionized oxygen, together with typical values for the magnetic field strength H.

TABLE

| Process Stream Flow Rate (GPM) | Ionized $O_2$ Injection Rate (CFM) | Voltage (Vdc) | Current (A) | H (Gauss) |
| --- | --- | --- | --- | --- |
| 25 | 0.5 | 6 | 8 | 100,000 |
| 30 | 1.0 | 12 | 14 | 170,000 |
| 35 | 1.5 | 18 | 21 | 280,000 |
| 40 | 2.0 | 24 | 29 | 400,000 |
| 75 | 3.0 | 30 | 40 | 600,000 |

Thus, it can be seen from the Table that for a typical flow rate of 30 gallons per minute of water contaminated with typical contaminants, e.g., organics, oily emulsions, and heavy metals, as found in typical water streams from various sources, including metal finishing operations, municipal drinking water supplies, and the like, ionized oxygen may be injected at an injection rate of 1.0 cubic feet per minute, and DC power at 12 volts applied to a coil 38 as described above, resulting in a current of 14 amperes being drawn and a magnetic field of 170,000 Gauss imposed.

The last line of entries in the Table refers to the embodiment of the mixing vessel of the invention described with respect to FIGS. 5–7 below. It will be appreciated, of course, that these figures (as well as other specifics mentioned herein) are exemplary only and by no means limit the invention.

Figures 5, 6, 7:
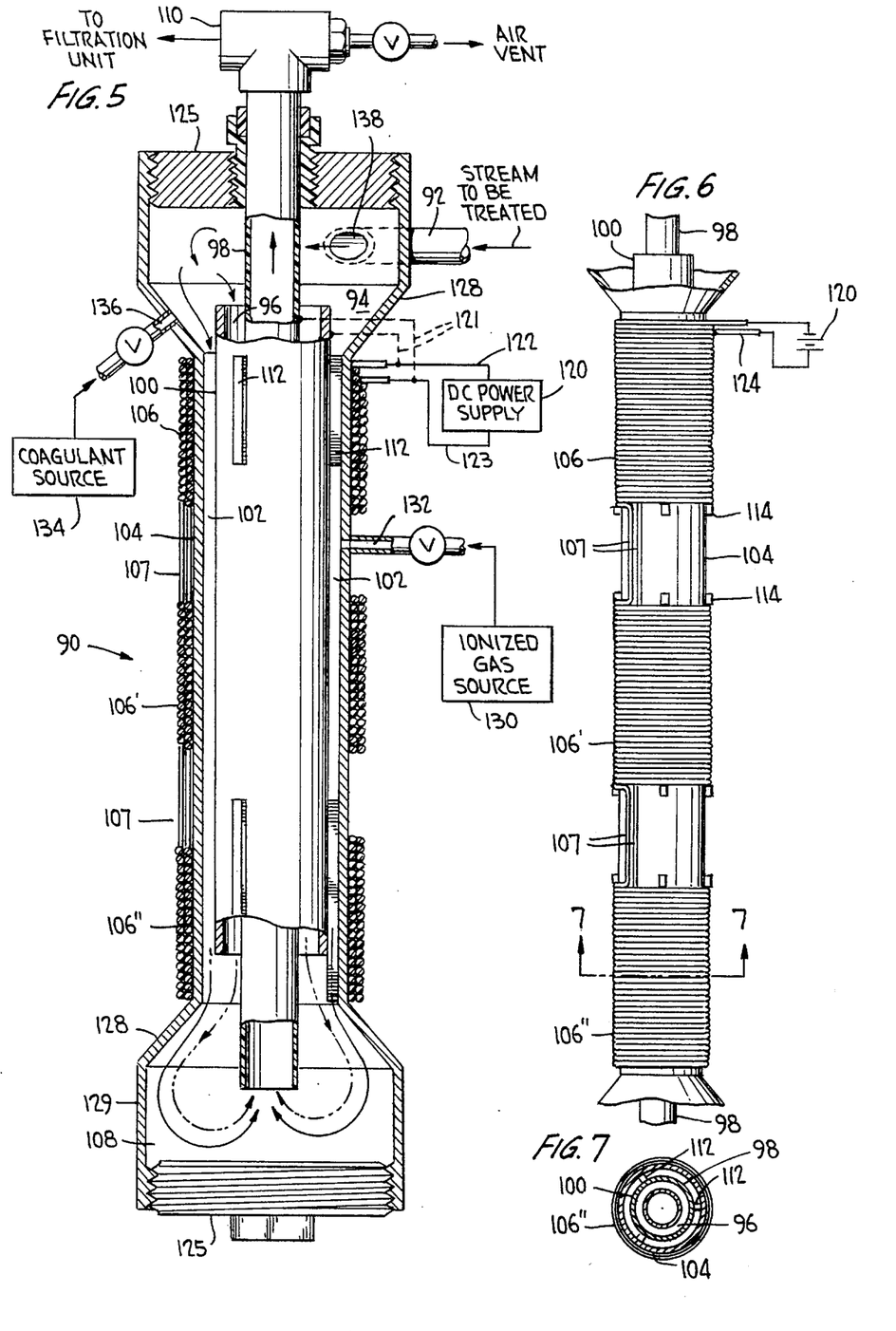
FIG. 5 shows a view corresponding to FIG. 2 of a second embodiment of the mixing vessel according to the invention.
FIG. 6 shows an elevation of the magnetic assembly of the vessel of FIG. 5.
FIG. 7 shows a cross-section along line 7—7 of FIG. 6.

As indicated above, FIGS. 5, 6, and 7 show an additional embodiment of the mixing vessel according to the invention, which may substituted substantially directly for that shown in FIGS. 1–4, with certain minor changes to the system configuration which will be apparent from the discussion below. The overall assembly is shown by FIG. 5, while details of the coil are shown by FIG. 6, and FIG. 7 shows a coaxial arrangement of tubes making up the assembly. The mixing vessel, in this embodiment termed 90, again comprises upper and lower mixing chambers and a coaxial assembly of tubes, such that liquid to be treated flows first in one direction vertically, then the opposite direction, in order to ensure counter-current mixing and highly turbulent flow.

In this embodiment, the stream to be treated is admitted at an upper inlet 92 in communication with an upper mixing chamber 94. The water stream flows downwardly, principally along an inner annular passage 96 between an inner exit tube 98 and an intermediate sleeve 100. However, a relatively small fraction of the influent water stream, e.g., 2–10%, flows downwardly along a second outer annular passage 102, defined between intermediate sleeve 100 and an outer tube 104 supporting coils 106 providing a magnetic field. Outer annular passage 102 is employed as a "premixing" chamber, wherein coagulant gases, chemicals and the like injected into the outer annular passage 102, as indicated at 132, 136, are initially dissolved homogeneously throughout a small fraction of the total water stream to be treated. This fraction is then readily dissolved in the remainder of the total stream to be treated, when the two portions of the total stream meet in lower mixing chamber 108.

More specifically, the inner exit tube 98 forms the return path along which water flows upwardly from the lower mixing chamber 108 to an exit passage 110 formed at the upper extremity of the unit 90. The inner annular passageway 96, defined between the inner tube 98 and the intermediate sleeve 100, is substantially open, such that most of the water flows downwardly therein, while a smaller proportion of the water flows downwardly through the outer annular passage 102, between sleeve 100 and outer tube 104. Flow of water down the outer annular passage 102 is restricted somewhat by the presence of members 112 supporting tube 100 with respect to tube 104; members 112 may be ordinary square keystock welded to the respective tubes, to support the assembly.

Additional sections of keystock 114 may be welded to the outer surface of tube 104 to support and space individual segments 106, 106'106" of coil axially from one another. Each coil segment includes inner and outer windings connected in series to a DC power source 120, shown as a battery, but not limited thereto. Power is supplied over a first conductor 122, wrapped around the uppermost portion of the outer tube 104, forming the inner layer of coil segment 106. A section of wire 107 extends axially along the tube to a second coil segment 106', and a further section of wire extends to a third section 106". Each segment of the coil also includes outer windings, wound upwardly and also connected in series. The return conductor 123 to power source 120 exits the assembly close to conductor 122, rendering the power supply connections convenient.

The overall construction techniques and proportions of the mixing chamber 90 in this embodiment are generally comparable to those of the embodiment of FIGS. 1–4. The inner tube 98 may be a section of 1½ inch PVC schedule 80 tubing, supported by a threaded end cap 125. (In a further modification discussed below, PVC tube 98 may be replaced by a section of steel tube.) The intermediate sleeve 100 can be a section of 3 inch diameter schedule 80 steel pipe 36 inches long, while the outer tube 104 forming the central section of vessel 90 can be a section of 4 inch diameter schedule 80 steel pipe 36 inches long. The upper and lower mixing chambers are formed by 4×6 inch concentric reducing couplings 128 welded on one end to the outer tube 104, and to 6 inch schedule 40 couplings 129 on the other. Two 6 inch threaded steel plugs form end caps 125 at either end. The upper end of the inner sleeve 100 is preferably raised at least about three inches above the point at which upper reducing coupling 128 meets the outer tube 104, to ensure proper flow splitting, that is, division of the incoming water stream in appropriate proportions between the inner and outer annular passageways 96 and 102, respectively. As indicated by the elliptical shape shown for inlet opening 138, inlet tube 92 intersects the upper mixing chamber 94 off-axis, such that a swirling, highly turbulent, mixing flow is provided throughout the flow path of liquid through the vessel 90.

Coagulant materials may be introduced into the stream of water to be treated at a venturi, as discussed above. Alternatively, ionized gas or other coagulant species from a source indicated at 130 can be introduced at an inlet 132 in communication with the outer annular space 102, wherein, as noted, a relatively small fraction of the stream to be treated flows downwardly. Coagulant materials, including ionized polymers and other coagulants, as well as magnetite ions or the like, may also be provided from a source 134 connected by an inlet passage 136 to upper mixing chamber 94 at a point below the upper end of sleeve 100, to ensure the coagulant flows downwardly through outer annular space 102, for mixing with a relatively small fraction of the incoming water stream.

As noted, dividing the incoming flow into smaller and larger components, and introducing the coagulants into the smaller component, promotes better mixing thereof. This improvement is facilitated by provision of sleeve 100. Provision of an additional steel tube also further strengthens the solenoidal magnetic field exerted by the coil. Dividing the coil into three segments 106, 106', 106" causes each to function as a separate coil, that is, each segment has north and south poles, further increasing the beneficial effect of the magnetic field on coagulation of materials within the water stream to be treated.

However, while provision of the magnetic field by three segments of a single series-connected coil is believed to provide increased magnetic efficiency, up to 50%, with respect to a single coil having a similar number of turns, the invention is not to be constrained thereby. Further, while division of the incoming water stream between the inner and outer annular passageways is believed to increase the turbulence thereof and hence the efficiency of mixing, the invention is again not to be limited in this way.

The embodiment of the mixing vessel 90 of FIGS. 5–7 can be further modified to additionally comprise a source of magnetite ions for coagulation of contaminants. As noted above, magnetite ions can be conveniently generated in situ by passing a stream to be treated therewith between coaxial steel tubes across which a potential difference is maintained. In a corresponding modification of the vessel of the invention to provide magnetite ions in situ, the PVC material of exit tube 98 is replaced by steel tubing; in order to provide electrical isolation of steel exit tube from sleeve 100 and outer tube 104, the exit tube is supported by a PVC plastic compression fitting in lieu of end cap 125. A DC power supply is then connected as shown in phantom at 121 across the steel exit tube and intermediate sleeve 100, so that a radial electric field is provided therebetween. When current flows therebetween, through the water stream, iron atoms from the charged steel tubes will be released into the water stream; magnetite ions will be formed thereby by reaction with oxygen dissolved in the water to be treated, or with additional oxygen added, e.g., at 132. The polarity of the DC potential supplied should be reversed at intervals, to prevent scaling of either the exit tube or the intermediate sleeve.

In that both the exit tube and intermediate sleeve serve as sources of magnetite ions, both will be sacrificial, and will require replacement at intervals depending on the amount of current flow. Accordingly, the design of the vessel should permit their convenient replacement. For example, both the exit tube and the intermediate sleeve may be fabricated of standard sizes of steel tubing. As noted, the steel exit tube may be supported by a compression fitting in the end cap, while the intermediate sleeve 100 may be wedged within the outer tube 104, so that their replacement does not involve welding or the like. In this modification coils 106, 106', 106" may be omitted, or may be provided downstream, to provide a magnetic field for further stimulating coagulation of contaminants by the magnetite ions.

While a number of aspects of several preferred embodiments of the invention have been discussed in detail, it will be appreciated that these are exemplary only and that the invention is susceptible of many modifications and improvements, including those within the state of the art at the time of filing of the application and others that may be subsequently invented. Therefore, the invention should not be limited by the above disclosure, but only by the following claims.

What is claimed is:

1. A method of mixing a stream of liquid to be treated with a stream of a treatment gas or liquid, comprising the steps of:

admitting said stream of liquid to be treated to a vertically elongated vessel comprising a first lower mixing chamber, an intermediate elongated tubular portion, and a second upper mixing chamber, a first one of said first lower and second upper mixing chambers having an inlet for receiving said stream of said liquid to be treated, admitting said stream of a treatment gas or liquid to said first one of said mixing chambers so as to become entrained with said stream of liquid to be treated near said inlet, wherein said inlet at which said stream of said liquid to be treated is admitted to said first one of said mixing chambers is located such that said stream of said liquid to be treated having had said stream of treatment liquid or gas entrained therein flows tangentially around the said first mixing chamber and thence in a generally spiral pattern along said intermediate elongated tubular portion, reaching the second of said mixing chambers, a fluid exit tube extending vertically through said vertically elongated vessel from an open end disposed in the second of said mixing chambers to a discharge end, such that liquid from said second mixing chamber flows through said fluid exit tube, said fluid exit tube being located generally concentrically within said intermediate elongated tubular portion of said vessel such that said generally spiral flow pattern of said stream of said liquid to be treated having had said stream of treatment liquid or gas entrained therein continues around said fluid exit tube, and applying an electromagnetic field to said stream of said liquid to be treated having had said stream of treatment liquid or gas entrained therein, at least during flow of said stream in said intermediate elongated tubular portion of said vessel, whereby said treatment fluid or gas is intimately mixed with said stream of liquid to be treated during flow through said vessel, said treatment fluid or gas being selected to coagulate materials in said stream to be treated.

2. The method of claim 1, wherein said stream of treatment fluid or gas comprises an ionized gas.

3. The method of claim 2, wherein said stream of treatment fluid or gas comprises an stream of ionized polymer.

4. The method of claim 1, wherein said electromagnetic field is applied to said stream by applying DC power to a coil wrapped around at least said intermediate elongated tubular portion of said vessel.

5. The method of claim 4, wherein said coil comprises a number of series-connected, axially spaced coil segments disposed around said intermediate elongated portion of said vessel.

6. The method of claim 4, comprising the further step of reversing the polarity of said DC power at intervals.

7. The method of claim 6, wherein said polarity is reversed at intervals on the order of minutes.

8. The method of claim 1, comprising the further step of controlling the rate of addition of said treatment fluid or gas and the relative intensity of the electromagnetic field responsive to the rate of flow of the stream of liquid to be treated.

9. The method of claim 1, comprising the further step of mixing a stream of magnetite coagulant material to said stream of said liquid to be treated.

10. The method of claim 1, wherein said first one of said mixing chambers to which said stream of liquid is admitted is the upper of said mixing chambers.

11. The method of claim 1, wherein said first one of said mixing chambers to which said stream of liquid is admitted is the lower of said mixing chambers.

12. The method of claim 1, where said first and second mixing chambers each have orifices at which they meet said intermediate tubular portion of said vessel, and wherein said orifices are of smaller diameter than the largest interior dimension of said mixing chambers.

* * * * *